US011880459B2

(12) United States Patent
Wang et al.

(10) Patent No.: US 11,880,459 B2
(45) Date of Patent: Jan. 23, 2024

(54) METHOD AND APPARATUS FOR CONTROLLING MOBILE STORAGE DEVICE, AND COMPUTER-READABLE MEDIUM

(71) Applicant: Siemens Aktiengesellschaft, Munich (DE)

(72) Inventors: Zhe Wang, Beijing (CN); Yong Ji Gao, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/922,103

(22) PCT Filed: Apr. 30, 2020

(86) PCT No.: PCT/CN2020/088487
§ 371 (c)(1),
(2) Date: Oct. 28, 2022

(87) PCT Pub. No.: WO2021/217652
PCT Pub. Date: Nov. 4, 2021

(65) Prior Publication Data
US 2023/0131910 A1    Apr. 27, 2023

(51) Int. Cl.
*G06F 21/50* (2013.01)
*G06F 21/56* (2013.01)
(Continued)

(52) U.S. Cl.
CPC ........ *G06F 21/565* (2013.01); *G06F 21/6218* (2013.01); *G06F 21/78* (2013.01);
(Continued)

(58) Field of Classification Search
CPC .............. G06F 21/565; G06F 21/6218; G06F 2221/034; G06F 21/50; G06F 21/56; G06F 21/62; G06F 21/78
See application file for complete search history.

(56) References Cited

U.S. PATENT DOCUMENTS

| 10,628,263 B1 * | 4/2020 | Cowen ................ G06F 11/1435 |
| 10,990,671 B2 * | 4/2021 | Tutika ..................... G06F 16/17 |

(Continued)

FOREIGN PATENT DOCUMENTS

| CN | 101 329 709 | 12/2008 | ............ G06F 21/00 |
| CN | 103 093 145 | 5/2013 | ............ G06F 21/55 |

(Continued)

OTHER PUBLICATIONS

Search Report for International Application No. PCT/CN2020/088487, 10 pages, dated Feb. 1, 2021.
(Continued)

*Primary Examiner* — Jayesh M Jhaveri
(74) *Attorney, Agent, or Firm* — Slayden Grubert Beard PLLC (57) ABSTRACT

Various embodiments include a mobile storage device control system. The system may include an independently operating scanning apparatus configured to: detect insertion of a mobile storage device, scan the mobile storage device to determine whether the mobile storage device poses a security threat, perform a specific operation on the mobile storage device so the specific operation is recorded in a file system log of the mobile storage device, and the record of the specific operation is used to mark whether the mobile storage device has been modified after being scanned. The system may include a control apparatus configured to: detect insertion of the mobile storage device, check whether the last record in the file system log in the mobile storage device is the record of the specific operation, if so, permit a user to
(Continued)

access the mobile storage device and otherwise prohibit the user from accessing the mobile storage device.

9 Claims, 4 Drawing Sheets

(51) Int. Cl.
    *G06F 21/62*     (2013.01)
    *G06F 21/78*     (2013.01)
(52) U.S. Cl.
    CPC .............. *G06F 21/50* (2013.01); *G06F 21/56* (2013.01); *G06F 2221/034* (2013.01)

(56) References Cited

U.S. PATENT DOCUMENTS

| | | | |
|---|---|---|---|
| 11,366,911 B2 | 6/2022 | Schramm et al. | |
| 2010/0011351 A1 | 1/2010 | Tsvi | .............................. 717/174 |
| 2017/0351877 A1* | 12/2017 | Knapp | .................. H04L 63/145 |
| 2017/0353460 A1* | 12/2017 | Knapp | .................. H04L 9/3236 |
| 2019/0012458 A1* | 1/2019 | Fausak | .................. G06F 21/565 |
| 2019/0220594 A1 | 7/2019 | Tutika et al. | |

FOREIGN PATENT DOCUMENTS

| | | | | |
|---|---|---|---|---|
| CN | 105 069 382 | | 11/2015 | ............. G06F 21/80 |
| CN | 109 033 313 | | 12/2018 | ............. G06F 17/30 |
| CN | 110 598 428 | | 12/2019 | ............. G06F 21/60 |
| WO | 2019/242972 | A1 | 12/2019 | |

OTHER PUBLICATIONS

Extended European Search Report, Application No. 20933965.4, 6 pages, dated Nov. 21, 2023.

* cited by examiner

METHOD AND APPARATUS FOR CONTROLLING MOBILE STORAGE DEVICE, AND COMPUTER-READABLE MEDIUM

CROSS-REFERENCE TO RELATED APPLICATIONS

This application is a U.S. National Stage Application of International Application No. PCT/CN2020/088487 filed Apr. 30, 2020, which designates the United States of America, the contents of which are hereby incorporated by reference in their entirety.

TECHNICAL FIELD

The present disclosure relates to the technical field of information security. Various embodiments of the teachings herein include mobile storage device control methods, apparatus, and/or computer-readable medium.

BACKGROUND

Universal serial bus (USB) and other mobile storage devices have greatly facilitated file storage. However, they have also brought with them security risks, such as virus transmission and network attacks. Industrial control systems (ICS) generally prohibit connection to the internet, so mobile storage devices are the principal means of transmission of malware in industrial control systems. Malware can be transmitted to a mobile storage device in an office environment, and then be transmitted in an industrial control system by using the mobile storage device in the industrial control system.

Existing methods of controlling mobile storage devices include:

1) Anti-malware—The use of anti-malware in office environments is a relatively common practice, but there are limitations on its use in industrial control systems. The vast majority of industrial control systems lack computing power or only have very limited computing resources, and are thus not able to run such software. Furthermore, the updating of anti-malware is restricted in industrial control systems. Industrial processes in industrial control systems can generally not be interrupted, and the network topology is relatively complex and isolated from the outside.

2) Conventional mobile storage device control—Taking USB as an example, conventional USB device control methods include: USB port disablement, or prohibiting the reading of files from USB devices, or only permitting certain USB devices to be used, etc. The first two control methods make it very inconvenient to copy data to an industrial control system, while the last method will put the industrial control system at risk. For example: when an engineer uses a compliant USB device to copy a project file from his or her notebook computer to the industrial control system, malware might be transmitted from the notebook computer into the industrial control system.

SUMMARY

Various embodiments of the teachings of the present disclosure include a mobile storage device control method and apparatus and a computer-readable medium, for reliably defending against security threats which might be carried by mobile storage devices. As an example, some embodiments include a mobile storage device control system with: an independently operating scanning apparatus, configured to: detect insertion of a mobile storage device; scan the mobile storage device, to determine that the mobile storage device does not pose a security threat; perform a specific operation on the mobile storage device, so that the specific operation is recorded in a file system log of the mobile storage device, and the record of the specific operation is used to mark whether the mobile storage device has been modified after being scanned; a control apparatus, configured to: detect insertion of the mobile storage device; check whether the last record in the file system log in the mobile storage device is the record of the specific operation; if so, permit a user to access the mobile storage device; otherwise, prohibit the user from accessing the mobile storage device.

As another example, some embodiments include a mobile storage device scanning method performed on an independently operating scanning apparatus, the method comprising: detecting insertion of a mobile storage device; scanning the mobile storage device, to determine that the mobile storage device does not pose a security threat; performing a specific operation on the mobile storage device, so that the specific operation is recorded in a file system log of the mobile storage device, and the record of the specific operation is used to mark whether the mobile storage device has been modified after being scanned.

In another example, some embodiments include a mobile storage device control method including: detecting insertion of a mobile storage device; checking whether the last record in a file system log in the mobile storage device is a record of a specific operation, wherein the record is formed by the mobile storage device undergoing the specific operation after being scanned and determined to not pose a security threat; if so, permitting a user to access the mobile storage device; otherwise, prohibiting the user from accessing the mobile storage device.

As another example, some embodiments include a mobile storage device scanning apparatus including: a detection module, configured to detect insertion of a mobile storage device; a scanning module, configured to scan the mobile storage device, to determine that the mobile storage device does not pose a security threat; an operation recording module, configured to perform a specific operation on the mobile storage device, so that the specific operation is recorded in a file system log of the mobile storage device, and the record of the specific operation is used to mark whether the mobile storage device has been modified after being scanned.

As another example, some embodiments include a mobile storage device control apparatus including: a detection module, configured to detect insertion of a mobile storage device; a control module, configured to: check whether the last record in a file system log in the mobile storage device is a record of a specific operation, wherein the record is formed by the mobile storage device undergoing the specific operation after being scanned and determined to not pose a security threat; if so, permit a user to access the mobile storage device; otherwise, prohibit the user from accessing the mobile storage device.

As another example, some embodiments include a mobile storage device scanning apparatus including: at least one memory, configured to store computer-readable code; at least one processor, configured to call the computer-readable code, and perform the method provided in the second aspect.

As another example, some embodiments include a mobile storage device control apparatus including: at least one memory, configured to store computer-readable code; at least one processor, configured to call the computer-readable code, and perform the method provided in the third aspect.

As another example, some embodiments include a computer-readable medium with computer-readable instructions are stored on the computer-readable medium, and the computer-readable instructions, when executed by a processor, cause the processor to perform one or more of the methods described herein.

In some embodiments, a file system log is used to identify whether a mobile storage device has been modified after scanning. Because the file system log is difficult to operate (requiring operating system kernel permissions), the control scheme is highly reliable. Moreover, because only the last record in the file system log is checked, the speed is execution is fast, and few computing resources are occupied.

In some embodiments, after scanning the mobile storage device but before performing a specific operation on the mobile storage device, the following is further included: judging whether the mobile storage device uses a journaling file system, and if the mobile storage device does not use a journaling file system, then copying data on the mobile storage device; formatting the mobile storage device as a journaling file system; copying back the data onto the mobile storage device. Thus, it is possible not only to retain the data on the mobile storage device but also to use the method provided in embodiments of the present invention to ensure that the mobile storage device does not pose a security threat.

In some embodiments, the specific operation comprises: creating a signature file; and deleting the created signature file. In this way, normal use of the mobile storage device will not be affected.

KEY TO THE DRAWINGS

| 10: industrial control system | 1011: industrial controller | 1012: distributed input/output device |
|---|---|---|
| 1013a: engineer station | 1013b: operator station | 1013c: server |
| 1013d: human machine interface | 1014: industrial Ethernet | 102: field device |
| 100: control unit | 200: mobile storage device control system | 201: scanning apparatus |
| 202: control apparatus | 20: mobile storage device | 2011: at least one memory |
| 2012: at least one processor | 2013: communication module | 2014: I/O interface |
| 30: scanning program | 40: file system log | 301: detection module |
| 302: scanning module | 303: operation recording module | 2021: at least one memory |
| 2022: at least one processor | 2023: I/O interface | 50: control program |
| 501: detection module | 502: control module | S601-S607: method steps |
| S701-S703: method steps | | |

DETAILED DESCRIPTION

The subject matter of the present disclosure described herein is now discussed with reference to exemplary embodiments. It should be understood that these embodiments are discussed purely in order to enable those skilled in the art to better understand and thus implement the subject matter described herein, without limiting the protection scope, applicability or examples expounded in the claims. The functions and arrangement of the elements discussed can be changed without departing from the protection scope of the content of the embodiments of the present invention. Various processes or components can be omitted from, replaced in or added to each example as required. For example, the method described may be performed in a different order from that described, and all of the steps may be added, omitted or combined. In addition, features described in relation to some examples may also be combined in other examples.

As used herein, the term "comprises" and variants thereof denote open terms, meaning "including but not limited to". The term "based on" means "at least partly based on". The terms "one embodiment" and "an embodiment" mean "at least one embodiment". The term "another embodiment" means "at least one other embodiment". The terms "first", "second", etc. may denote different or identical objects. Other definitions may be included below, either explicit or implicit. Unless clearly indicated in the context, the definition of a term is the same throughout the specification.

Some embodiments include a mobile storage device meaning a device which, in contrast to a fixed storage device, can copy and store files between different devices. This may include but is not limited to:

USB devices, also called mobile flash memory devices; phase change rewritable optical disk drive (PD) devices; magneto optical (MO) drive devices; mobile hard disks; floppy drive (FD) devices; flash memory devices, e.g. smart media (SM) cards, compact flash (CF) cards, multi media cards, secure digital (SD) cards, memory sticks and TF cards, etc.

An industrial control system (also called OT system) according to the definition of the company Gartner, operational technology (OT) uses hardware and software to realize detection and control through direct monitoring and/or control of physical devices, processes and events in an enterprise. An OT system uses a computer to monitor or change the physical state of a system. An industrial control system may be regarded as an example of an OT system. An ICS is realized on the basis of a computer, and used for remote monitoring and/or control of key processes and physical functions in a factory for example. Examples of ICSs include: supervisory control and data acquisition (SCADA) systems, distributed control systems (DCS), computer numerical control (CNC) systems (including computerized mechanical tools), and scientific devices (e.g. digital oscilloscopes).

Figure 1:
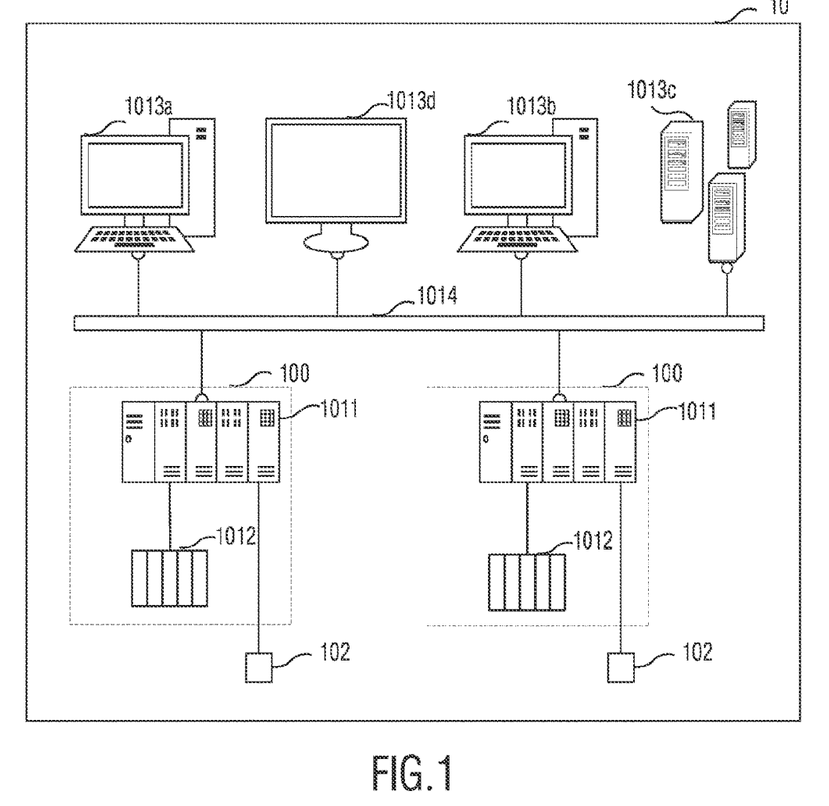
FIG. 1 is a structural schematic diagram of an industrial control system incorporating teachings of the present disclosure.

FIG. 1 shows an exemplary structure of an industrial control system incorporating teachings of the present disclosure. As shown in FIG. 1, the industrial control system may include but is not limited to the following devices: at least one industrial controller 1011. The industrial controller 1011 may be a programmable logic controller (PLC), a DCS controller or an RTU, etc. The at least one industrial controller 1011 may be connected to a distributed I/O device 1012 or have a distributed I/O interface integrated in itself, for controlling data input and output. The industrial controller 1011 may further be connected to a field device 502, for controlling operations of the field device 502. Most industrial controllers 1011 are special-purpose embedded devices, realized on the basis of an embedded operating system (e.g. VxWorks, embedded Linux, EOS, ucLinux and various private operating systems, etc.). The industrial controller 1011 is used to realize reliable, real-time industrial control, and generally lacks security characteristics such as access control (e.g. identification, authentication, authorization, etc.). A control unit 100 may comprise at least one industrial controller 1011.

Some embodiments may include at least one distributed input/output (I/O) device 1012 and at least one industrial host computer. Industrial host computers may include various upper-level computers such as workstations or servers, realized on the basis of personal computers (PC). Examples are an engineer station 1013a, an operator station 1013b, a server 1013c and a human machine interface (HMI) 1013d, etc. In the industrial control system 10, the industrial host computer can monitor and control the industrial controller 1011 by means of an industrial Ethernet 1014, e.g. control the industrial controller 1011 to read data from a field device 40 (e.g. read field device state parameters from a sensor), store the data in a historical database, and send a control command to the industrial controller 1011 according to an operator's instruction or a preset control program or logic, and so on. The engineer station 1013a may also configure the industrial controller 1011. The industrial host computer has a mobile storage device interface, which is the main route of malware transmission in the industrial control system 10.

Some embodiments include an industrial control network 1014. The industrial control network 1014 may comprise at least one network device, for connecting each industrial controller 1011 and industrial host computer. At present, more and more industrial control networks 1014 are realized on the basis of industrial Ethernet. Communication in the industrial control network 1014 may be based on transmission control protocol (TCP), user datagram protocol (UDP), internet protocol (IP) and Ethernet, etc., and the network device therein may include but is not limited to: a router, a switch, etc. The industrial control network 1014 may also be connected to another network, e.g. a factory network, office network, etc.

Figure 2:
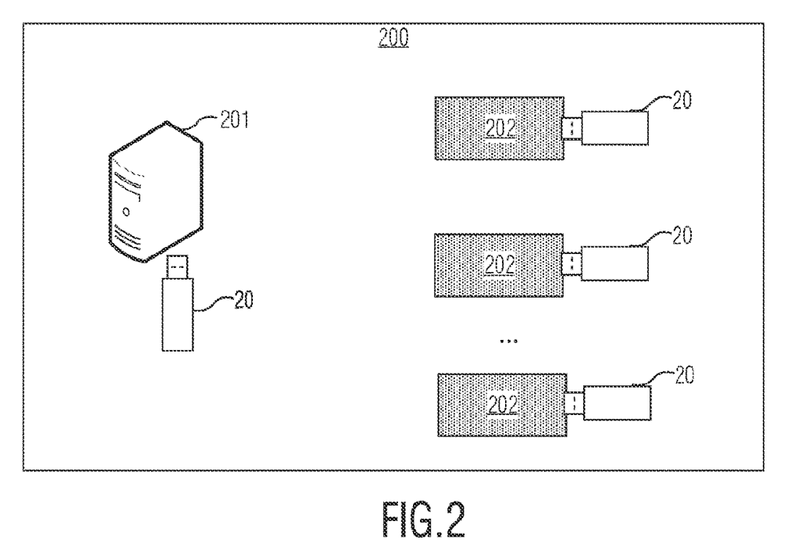
FIG. 2 is a schematic diagram of a mobile storage device control system incorporating teachings of the present disclosure.
Figure 3:
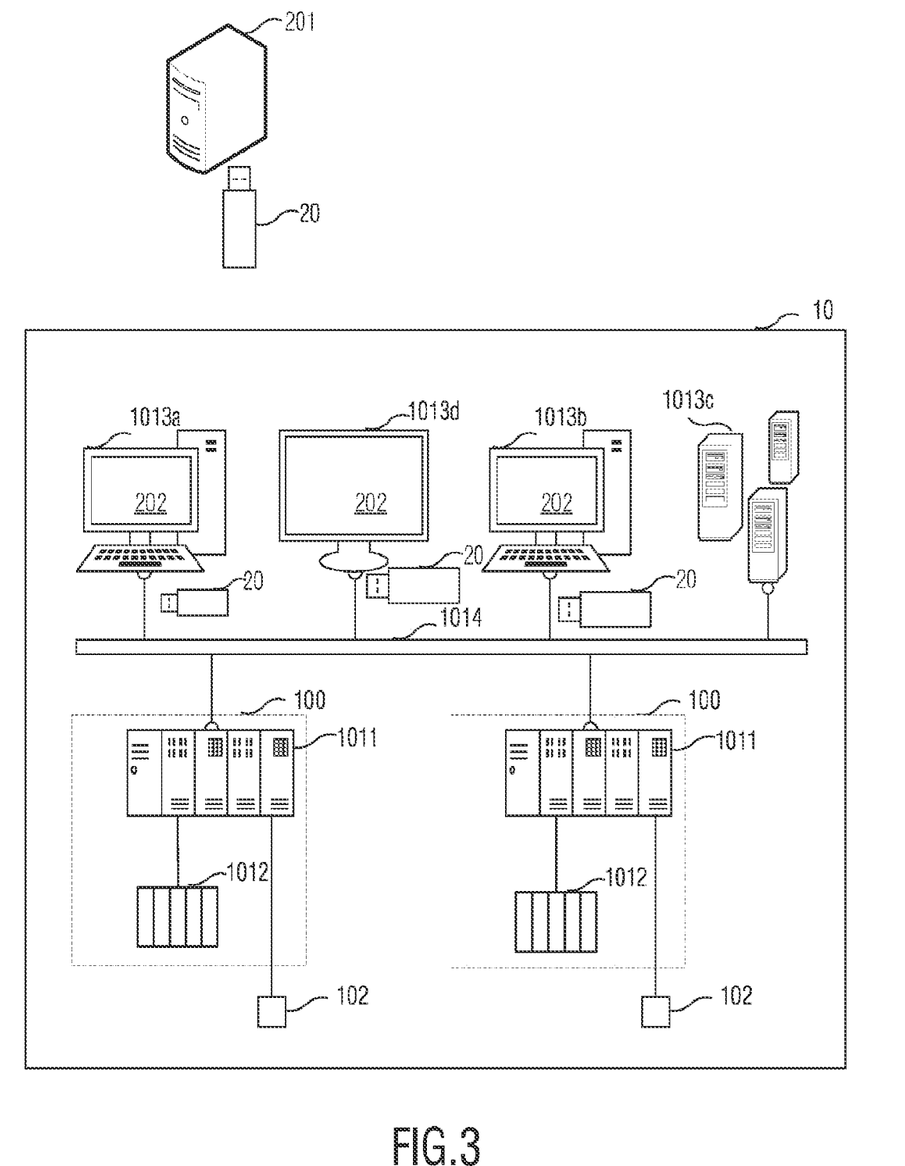
FIG. 3 is a schematic diagram of a mobile storage device control system incorporating teachings of the present disclosure, deployed on an industrial control system.

FIG. 2 shows a schematic structural diagram of a mobile storage device control system 200 incorporating teachings of the present disclosure. As shown in FIG. 2, the system 200 may comprise: a scanning apparatus 201 and at least one control apparatus 202. The system 200 may be deployed on the industrial control system 10 in the manner shown in FIG. 3.

Anti-malware is installed on the scanning apparatus 201; the anti-malware may be used to detect all possible security threats to the computer system, such as viruses, malware and various security attacks. Usually, it is in an independent (standalone) state, not connected to the internet. The anti-malware thereon can periodically receive updates via the internet in a safe manner, e.g. virus library updates, etc. The scanning apparatus 201 may be used to scan a mobile storage device 20, to prevent the mobile storage device 20 from causing a security threat to the industrial control system 10.

The control apparatus 202 is deployed on the industrial host computer in the industrial control system 10, and used to ensure that each inserted mobile storage device 20 has been scanned by the scanning apparatus 201, and does not pose a security threat.

Figure 4:
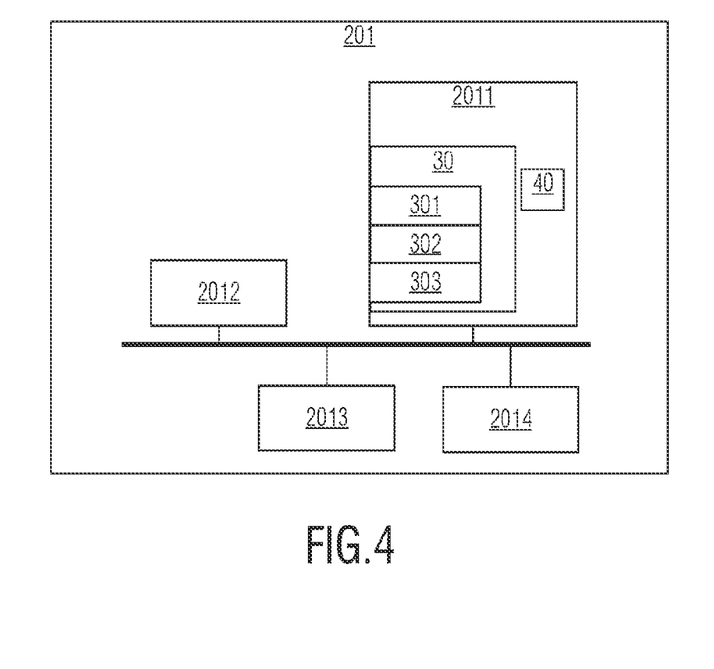
FIG. 4 is a structural schematic diagram of a scanning apparatus incorporating teachings of the present disclosure.

The scanning apparatus 201 described herein may be implemented as a network of computer processors, in order to perform the scanning methods as described herein. The scanning apparatus 201 may also be a single computer as shown in FIG. 4, comprising at least one memory 2011, which comprises a computer-readable medium, e.g. random access memory (RAM). The scanning apparatus 201 further comprises at least one processor 2012 coupled to the at least one memory 2011. Computer executable instructions are stored in the at least one memory 2011, and, when executed by the at least one processor 2012, can cause the at least one processor 2012 to perform the steps of a scanning method 600.

The at least one processor 2012 may comprise a microprocessor, an application specific integrated circuit (ASIC), a digital signal processor (DSP), a central processing unit (CPU), a graphics processing unit (GPU), a state machine, etc. Embodiments of computer readable media include, but are not limited to, floppy disks, CD-ROM, magnetic disks, memory chips, ROM, RAM, ASIC, configured processors, all-optical media, all magnetic tapes or other magnetic media, or any other media from which instructions can be read by a computer processor. In addition, various other forms of computer readable media may send or carry instructions to a computer, including routers, dedicated or public networks, or other wired and wireless transmission devices or channels. The instructions may include code of any computer programming language, including C, C++, C language, Visual Basic, Java and JavaScript. In addition, the scanning apparatus 201 may further comprise a communication module 2013, for network connection to perform virus library updating, etc. The mobile storage device 20 may be connected to the scanning apparatus 201 via the I/O interface 2014.

When executed by the at least one processor 2012, the at least one memory 2011 shown in FIG. 4 may contain a scanning program 30, which causes the at least one processor 2012 to perform the scanning method 600 described in the present disclosure. The mobile storage device control program 30 may comprise: a detection module 301, configured to detect insertion of the mobile storage device 20; a scanning module 302, configured to scan the mobile storage device 20, to determine that the mobile storage device 20 does not pose a security threat; an operation recording module 303, configured to perform a specific operation on the mobile storage device 20, so that the specific operation is recorded in a file system log 40 of the mobile storage device 20, and the record of the specific operation is used to mark whether the mobile storage device 20 has been modified after being scanned. The file system log 40 may also be stored in at least one memory 2021.

In some embodiments, the operation recording module 303 may also be configured to judge whether the mobile storage device 20 uses a journaling file system after the scanning module 302 scans the mobile storage device 20 but before the operation recording module 303 performs a specific operation on the mobile storage device 20, and if the mobile storage device 20 does not use a journaling file system, then: copy data on the mobile storage device 20; format the mobile storage device 20 as a journaling file system; and copy data back onto the mobile storage device 20.

In some embodiments, the specific operation comprises creating a signature file; and deleting the created signature file.

Figure 6:
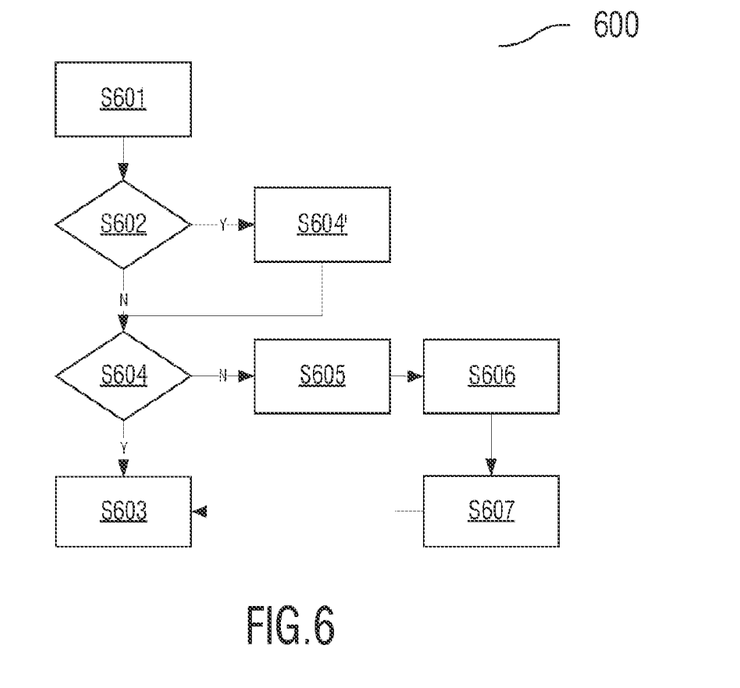
FIG. 6 is a flow chart of a scanning method incorporating teachings of the present disclosure.

The scanning method 600 performed on the mobile storage device 20 by the scanning apparatus 201 is explained in detail below with reference to FIG. 6. As FIG. 6 shows, the scanning method 600 may comprise multiple elements.

S601: when a user inserts the mobile storage device 20 into the I/O interface 2014 of the scanning apparatus 201, the scanning apparatus 201 detects the insertion of the mobile storage device 20.

S602: the scanning apparatus 201 begins to scan the mobile storage device 20, to determine that the mobile storage device 20 does not pose a security threat, e.g. scans whether the mobile storage device 20 is infected with a virus, has malware installed on it, etc. If it is determined that the mobile storage device 20 poses a security threat, step S604' is performed, otherwise step S604 is performed.

S604': the scanning apparatus 201 can perform a virus-killing operation on the mobile storage device 20, and if all viruses on the mobile storage device 20 are killed, it can be determined that the mobile storage device 20 no longer poses a security threat, and the method can proceed to step S604. In another optional embodiment, if it is determined in step S602 that the mobile storage device 20 poses a security threat, then subsequent operations on the mobile storage device 20 are prohibited, and it is prevented from infecting the scanning apparatus 201. Optionally, the user may be informed that: the mobile storage device 20 has been infected with a virus, and cannot be used in the industrial control system 20—please pull out the mobile storage device 20.

S604: judging whether the mobile storage device 20 uses a journaling file system, e.g. an NTFS (new technology file system). If the mobile storage device 20 uses a journaling file system, the method proceeds to step S603, otherwise steps S605-S607 are performed.

S605: copying data on the mobile storage device 20.

S606: formatting the mobile storage device 20 as a journaling file system.

S607: copying data back onto the mobile storage device 20.

Steps S605-S606 may be performed automatically by the scanning apparatus 201, with no need for user participation, or may also be performed through interaction with the user. For example: the user is informed that no journaling file system is used on the mobile storage device 20, and the user is prompted to copy the data on the mobile storage device 20. The user can copy the data on the mobile storage device 20, and after confirming that copying has been successful, notify the scanning apparatus 201 via a confirmation button, etc.; the scanning apparatus 201 can then begin the formatting operation, to format the mobile storage device 20 as a journaling file system. Once formatting is complete, the scanning apparatus 201 can tell the user to copy the data back onto the mobile storage device 20. When step S607 is complete, the scanning apparatus 201 proceeds to perform step S603.

S603: the scanning apparatus 201 performs a specific operation on the mobile storage device 20, so that the specific operation is recorded in a file system log of the mobile storage device 20. Because the file system log can only be performed by an operating system via a driver, an ordinary user cannot change the file system log directly, thus ensuring that the specific operation record cannot be tampered with, and thereby ensuring that it is possible to accurately identify the state of the mobile storage device 20, i.e. whether the mobile storage device 20 has been modified after being scanned on the scanning apparatus 201.

If is has not been modified, the mobile storage device 20 can be regarded as safe, and will not cause a security threat to the industrial control system 10. Optionally, the specific operation may comprise: creating a signature file, and deleting the created signature file. Such an operation will result in a file creation log and a file deletion log being left in the file system log, and the specific operation will not leave any file on the mobile storage device 20. Thus, these two logs may be used for the control apparatus 202 to check whether the mobile storage device 20 has been modified after scanning. Of course, the specific operation may also be another type of operation, or a series of operations, as long as it can leave an operation record in the file system log, so that the control apparatus 202 can perform a check on this basis.

After step S603, the scanning apparatus 201 can inform the user that scanning is complete, and the mobile storage device 20 can be pulled out.

Figure 5:
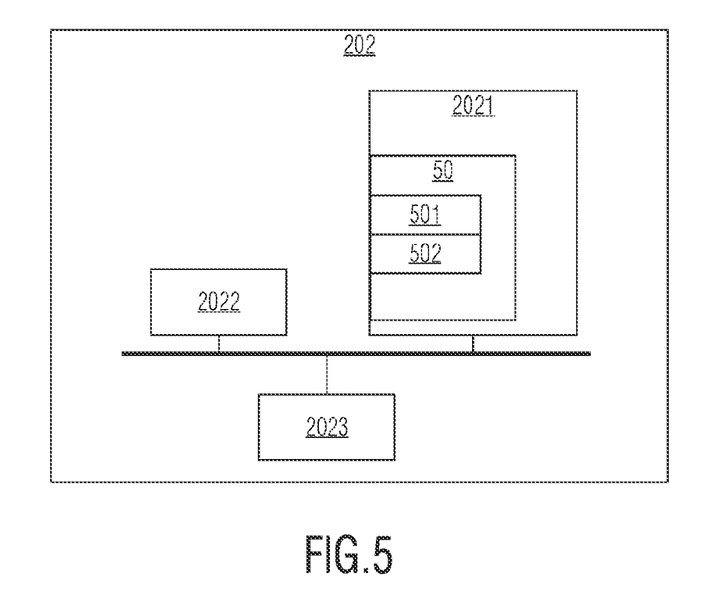
FIG. 5 is a structural schematic diagram of a control apparatus incorporating teachings of the present disclosure.

The control apparatus 202 described herein may be an executable program 50, installed on the industrial host computer in the industrial control system 10 or on another device that might be linked to the mobile storage device. Of course, these devices on which the executable program 50 is installed may also be regarded as the control apparatus 202. These devices may comprise at least one memory 2021, which comprises a computer readable medium, e.g. random access memory (RAM).

The apparatus 202 further comprises at least one processor 2022 coupled to the at least one memory 2021. Computer executable instructions are stored in the at least one memory 2021, and, when executed by the at least one processor 2022, can cause the at least one processor 2022 to perform the steps of a control method 700.

The at least one processor 2022 may comprise a microprocessor, an application specific integrated circuit (ASIC), a digital signal processor (DSP), a central processing unit (CPU), a graphics processing unit (GPU), a state machine, etc. Embodiments of computer readable media include, but are not limited to, floppy disks, CD-ROM, magnetic disks, memory chips, ROM, RAM, ASIC, configured processors, all-optical media, all magnetic tapes or other magnetic media, or any other media from which instructions can be read by a computer processor. In addition, various other forms of computer readable media may send or carry instructions to a computer, including routers, dedicated or public networks, or other wired and wireless transmission devices or channels. The instructions may include code of any computer programming language, including C, C++, C language, Visual Basic, Java and JavaScript. The mobile storage device 20 may be connected to the control apparatus 202 via the I/O interface 2023.

When executed by the at least one processor 2022, a control program 50 stored in the at least one memory 2021 causes the at least one processor 2022 to perform the control method 700 described in embodiments of the present invention. The mobile storage device control program 50 may comprise: a detection module 501, configured to detect insertion of the mobile storage device 20; and a control module 502, configured to: check whether the last record in a file system log in the mobile storage device 20 is a record of a specific operation, wherein the record is formed by the mobile storage device 20 undergoing the specific operation after being scanned and determined to not pose a security threat; if so, the user is permitted to access the mobile storage device 20; otherwise, the user is prohibited from accessing the mobile storage device 20.

Figure 7:
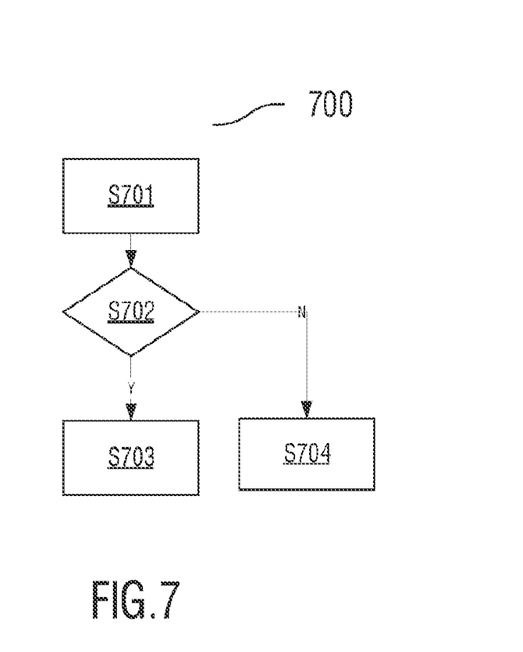
FIG. 7 is a flow chart of a control method incorporating teachings of the present disclosure.

The control method 700 performed on the mobile storage device 20 by the control apparatus 202 is explained in detail below with reference to FIG. 7. As FIG. 7 shows, the control method 700 may comprise:

S701: when a user inserts the mobile storage device 20 into the I/O interface 2023, the control apparatus 202 detects the insertion of the mobile storage device 20. Before determining that the mobile storage device 20 does not pose a security threat, the control apparatus 202 prohibits the user from accessing the mobile storage device 20.

S702: the control apparatus 202 checks whether the last record in the file system log in the mobile storage device 20 is the record of the specific operation mentioned above. Information about the specific operation may be set in the program 50 in advance, for the control apparatus 202 to make a judgment. For example, in the case of NTFS, the control apparatus 202 can check whether the last log written by the file (data overwrite/data extent/data truncation/file create) is the record of the specific operation mentioned above. If so, step S703 is performed, otherwise step S704 is performed.

S703: the control apparatus 202 determines that the mobile storage device 20 has not been modified after being scanned, and permits the user to access the mobile storage device 20.

S704: the control apparatus 202 determines that the mobile storage device 20 has been modified after being scanned, and prohibits the user from accessing the mobile storage device 20. The user may also be prompted to rescan the mobile storage device 20 on the scanning apparatus 201.

The various embodiments of the teachings of the present disclosure may comprise an apparatus having an architecture different from that shown in FIGS. 4 and 5. The architecture described above is merely exemplary, and serves to explain the method 600 and the method 700 provided in embodiments of the present invention.

In some embodiments, the modules described above may also be regarded as functional modules realized by hardware, for controlling the mobile storage device. For example, control logic of the processes involved in the method is burned into field-programmable gate array (FPGA) chips or complex programmable logic devices (CPLD) etc. in advance, with these chips or devices executing the functions of the modules described above. The particular manner of implementation may be determined according to engineering practice.

In some embodiments, a computer-readable medium may store computer-readable instructions when executed by a processor, cause the processor to perform one or more of the mobile storage device control methods described above. Examples of computer-readable media include floppy disks, hard disks, magneto-optical disks, optical disks (such as CD-ROM, CD-R, CD-RW, DVD-ROM, DVD-RAM, DVD-RW, DVD+RW), magnetic tapes, non-volatile memory cards and ROM. Optionally, a computer-readable instruction may be downloaded from a server computer or a cloud via a communication network.

In summary, in various embodiments of the teachings of the present disclosure, a file system log is used to identify whether a mobile storage device has been modified after scanning. Because the file system log is difficult to operate (requiring operating system kernel permissions), the control scheme is highly reliable. Moreover, because only the last record in the file system log is checked, the speed is execution is fast, and few computing resources are occupied. In some embodiments, the specific operation used to produce the file system log may be creation and deletion of a signature file, so normal use of the mobile storage device is not affected.

Not all of the steps and modules in the flows and system structure diagrams above are necessary; certain steps or modules may be omitted according to actual requirements. The order in which steps are executed is not fixed, but may be adjusted as required. The system structures described in the embodiments above may be physical structures, and may also be logical structures, i.e. some modules might be realized by the same physical entity, or some modules might be realized by multiple physical entities, or realized jointly by certain components in multiple independent devices.

What is claimed is:

1. A mobile storage device control system comprising:
an independently operating scanning apparatus configured to:
  detect insertion of a mobile storage device,
  scan the mobile storage device to determine whether the mobile storage device poses a security threat, and
  after determining the mobile storage device does not pose a security threat, perform a specific operation on the mobile storage device so that the specific operation is recorded in a file system log of the mobile storage device, wherein the record of the specific operation in the file system log is used to mark whether the mobile storage device has been modified after being scanned; and
a control apparatus configured to:
  detect insertion of the mobile storage device, check whether the last record in the file system log in the mobile storage device is the record of the specific operation, and
  if the last record in the file system log in the mobile storage device is the record of the specific operation, permit a user to access the mobile storage device, and otherwise prohibit the user from accessing the mobile storage device.

2. The mobile storage device control system as claimed in claim 1, wherein:
the operation recording module is further configured to judge whether the mobile storage device uses a journaling file system after the scanning module has scanned the mobile storage device and before the operation recording module performs a specific operation on the mobile storage device; and
if the mobile storage device does not use a journaling file system, then: copy data on the mobile storage device, format the mobile storage device as a journaling file system, and copy back the data onto the mobile storage device.

3. The mobile storage device control system as claimed in claim 1, wherein the specific operation comprises:
creating a signature file, and
deleting the created signature file.

4. A mobile storage device scanning and control method performed on an independently operating scanning apparatus, the method comprising:
  detecting insertion of a mobile storage device;
  scanning the mobile storage device to determine whether the mobile storage device poses a security threat; and
  after determining the mobile storage device does not pose a security threat, performing a specific operation on the mobile storage device so the specific operation is recorded in a file system log of the mobile storage device, wherein the record of the specific operation in the file system log is used to mark whether the mobile storage device has been modified after being scanned;
  detecting another insertion of the mobile storage device;
  checking whether the last record in a file system log in the mobile storage device is a record of the specific operation, wherein the record is formed by the mobile storage device undergoing the specific operation after being scanned and determined to not pose a security threat; and
  if the last record in a file system log in the mobile storage device is a record of the specific operation, permitting a user to access the mobile storage device, and otherwise prohibiting the user from accessing the mobile storage device.

5. The method as claimed in claim 4, further comprising, after scanning the mobile storage device and before performing a specific operation on the mobile storage device, judging whether the mobile storage device uses a journaling file system, and if the mobile storage device does not use a journaling file system, then:
  copying data from the mobile storage device to another storage device;
  formatting the mobile storage device as a journaling file system; and
  copying back the data onto the mobile storage device.

6. The method as claimed in claim 4, wherein the specific operation comprises:
  creating a signature file; and
  deleting the created signature file.

7. A system for a mobile storage device, the system comprising:
  a processor;
  a memory comprising:
    a detection module configured to detect insertion of a mobile storage device;
    a scanning module to scan the mobile storage device to determine whether the mobile storage device poses a security threat; and
    an operation recording module to perform a specific operation on the mobile storage device, so that the specific operation is recorded in a file system log of the mobile storage device and the record of the specific operation is used to mark whether the mobile storage device has been modified after being scanned;
  wherein the detection module is further configured to detect another insertion of the mobile storage device;
  wherein the control module is further configured to:
    check whether the last record in the file system log of the mobile storage device is the record of the specific operation; and
    if the last record in a file system log in the mobile storage device is the record of the specific operation, permit a user to access the mobile storage device, and otherwise prohibit the user from accessing the mobile storage device.

8. The system as claimed in claim 7, wherein:
the operation recording module is further configured to judge whether the mobile storage device uses a journaling file system after the scanning module has scanned the mobile storage device and before the operation recording module performs a specific operation on the mobile storage device; and
if the mobile storage device does not use a journaling file system, then: copy data from the mobile storage device to another storage device, format the mobile storage device as a journaling file system, and copy back the data onto the mobile storage device.

9. The system as claimed in claim 7, wherein the specific operation comprises:
  creating a signature file, and
  deleting the created signature file.

* * * * *